(12) United States Patent
Oechsner et al.

(10) Patent No.: US 10,578,642 B2
(45) Date of Patent: Mar. 3, 2020

(54) DEVICE AND METHOD FOR TESTING AN INERTIAL SENSOR

(71) Applicants: Robert Bosch GmbH, Stuttgart (DE); SPEKTRA SCHWINGUNGSTECHNIK UND AKUSTIK GMBH, Dresden (DE)

(72) Inventors: Herbert Oechsner, Schoental (DE); Martin Brucke, Dresden (DE); Matthias Woog, Dresden (DE); Michael Baus, Bietigheim-Bissingen (DE); Rainer Schreiber, Steinheim (DE)

(73) Assignees: ROBERT BOSCH GMBH, Stuttgart (DE); SPEKTRA SCHWINGUNSTECHNIK UND AKUSTIK GMBH, Dresden (DE)

( * ) Notice: Subject to any disclaimer, the term of this patent is extended or adjusted under 35 U.S.C. 154(b) by 253 days.

(21) Appl. No.: 15/541,645

(22) PCT Filed: Dec. 30, 2015

(86) PCT No.: PCT/EP2015/081440
§ 371 (c)(1),
(2) Date: Aug. 18, 2017

(87) PCT Pub. No.: WO2016/110439
PCT Pub. Date: Jul. 14, 2016

(65) Prior Publication Data
US 2017/0350918 A1    Dec. 7, 2017

(30) Foreign Application Priority Data
Jan. 8, 2015 (DE) .................. 10 2015 200 164

(51) Int. Cl.
G01P 21/00 (2006.01)
B06B 3/00 (2006.01)
G01C 25/00 (2006.01)

(52) U.S. Cl.
CPC ............ G01P 21/00 (2013.01); G01C 25/005 (2013.01)

(58) Field of Classification Search
CPC ........ G01P 21/00; G01C 25/005; G01C 25/00
(Continued)

(56) References Cited

U.S. PATENT DOCUMENTS 2,890,584 A  6/1959  Dickie
3,048,997 A  8/1962  Rork
(Continued)

FOREIGN PATENT DOCUMENTS

DE  102007059857 A1  6/2009
JP      S5138128 A     3/1976
(Continued)

OTHER PUBLICATIONS

DE102007059857 translation (Year: 2009).*
(Continued)

*Primary Examiner* — Nimeshkumar D Patel
*Assistant Examiner* — Nashmiya S Fayyaz
(74) *Attorney, Agent, or Firm* — Norton Rose Fulbright US LLP; Gerard Messina

(57) ABSTRACT

A device for testing an inertial sensor for a vehicle, which includes at least two attachment points, having at least one first oscillation body to which the inertial sensor is fastenable/is fastened, and having at least one first excitation module assigned to the first oscillation body for accelerating the first oscillation body in at least one direction. At least one second oscillation body is spaced apart from the first oscillation body, to which at least one second excitation module
(Continued)

is assigned for accelerating the second oscillation body, and that the inertial sensor is fastenable/is fastened with a first attachment point to the first oscillation body and with a second attachment point to the second oscillation body.

10 Claims, 3 Drawing Sheets

(58) Field of Classification Search
USPC .......................................... 73/1.38, 662, 663
See application file for complete search history.

(56) References Cited

U.S. PATENT DOCUMENTS 6,729,176 B2    5/2004  Begin

2007/0295087 A1   12/2007  Umeda
2009/0183550 A1   7/2009   Valasek et al.
2012/0103094 A1   5/2012   Tustaniwskyj et al.

FOREIGN PATENT DOCUMENTS

| JP | 60015538 A * | 1/1985 | ............. G01M 7/06 |
| JP | H06265438 A | 9/1994 | |
| JP | H10232246 A | 9/1998 | |
| JP | 2864038 B2 | 3/1999 | |
| SU | 855505 A1 | 8/1981 | |

OTHER PUBLICATIONS

International Search Report dated Apr. 21, 2016 issued in International Patent No. PCT/EP2015/081440, filed on Dec. 30, 2015.

* cited by examiner

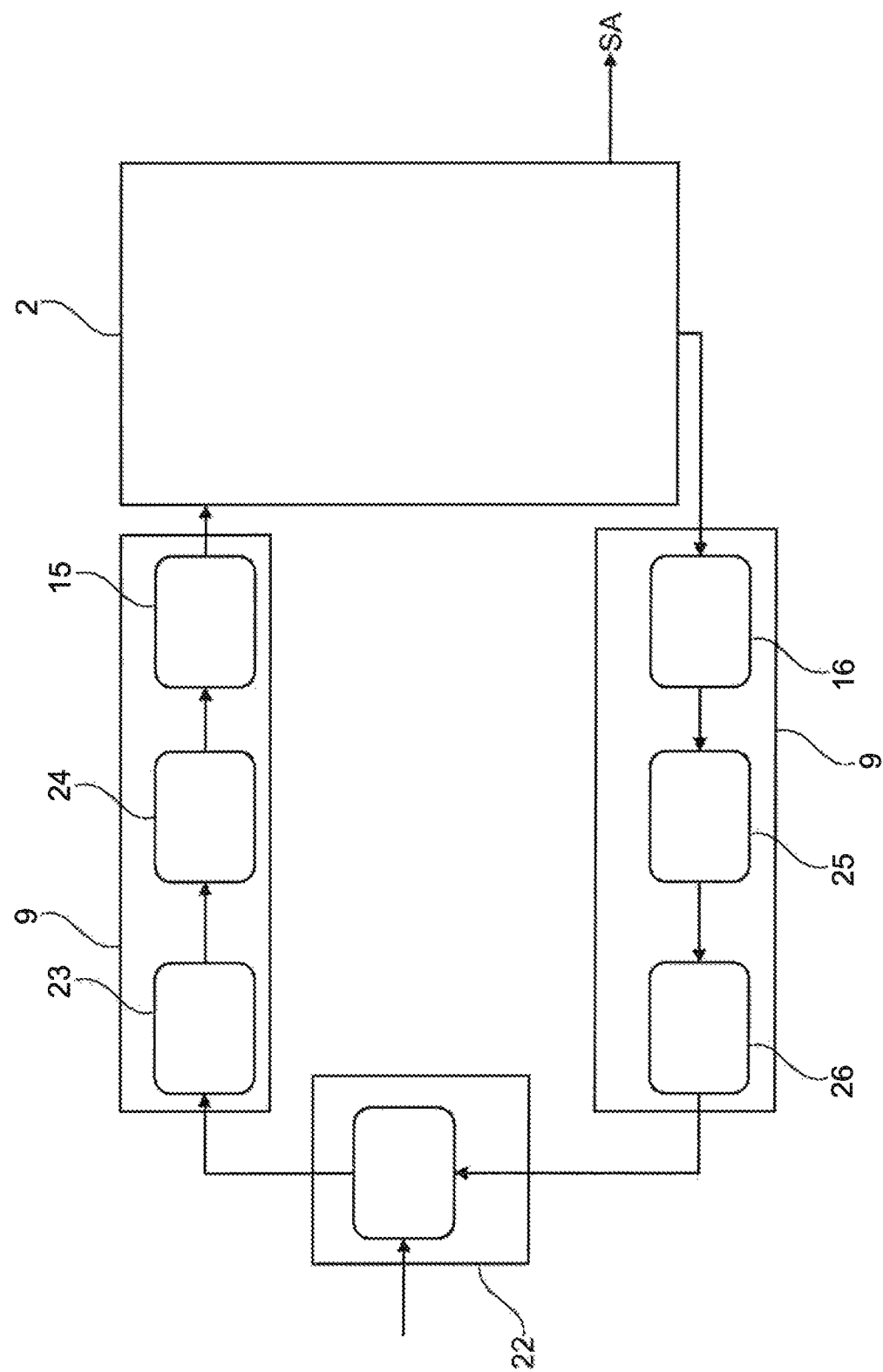

DEVICE AND METHOD FOR TESTING AN INERTIAL SENSOR

FIELD OF THE INVENTION

The present invention relates to a device for testing an inertial sensor, in particular, an acceleration sensor and/or a rotation rate sensor, for a vehicle, which includes at least two attachment points, having at least one first oscillation body to which the inertial sensor is fastenable/is fastened, and having at least one first excitation module assigned to the first oscillation body for accelerating the oscillation body in at least one direction.

The present invention further relates to a method for testing an inertial sensor, in particular, an acceleration sensor and/or a rotation rate sensor, for a vehicle, which includes at least two attachment points, the inertial sensor being fastened on at least one first oscillation body and the oscillation body being accelerated by at least one excitation module in at least one direction.

BACKGROUND INFORMATION

Devices and methods of the aforementioned type are believed to be understood. In order to test and adjust inertial sensors provided for vehicles, these inertial sensors are frequently examined on external test benches, in order to ascertain how different accelerations affect the inertial sensor when stationary. In this way, it is possible to calibrate the inertial sensor in such a way that the accelerations to be detected are detected and other interfering accelerations may be compensated for or ignored. For this purpose, it is known to fasten the inertial sensor to an oscillation body having a high mass such as, for example, a metal block or the like, and to accelerate the oscillation body via at least one excitation module in at least one direction. The signals detected or measured by the inertial sensor in the process, for example, accelerations or rotation rates, are stored and, if necessary, synchronized with expected acceleration values for calibrating the inertial sensor.

SUMMARY OF THE INVENTION

The device according to the present invention and the method according to the present invention have the advantage that the inertial sensor may be accelerated differently at different points. In this way, it is possible with the device to replicate even more accurately the application in the vehicle. The inertial sensor is frequently fastened to different body elements of a motor vehicle, which may also vibrate relative to one another. As a result of the advantageous design of the device, this behavior is replicated in that the inertial sensor may be accelerated differently at two different points. According to the present invention, it is provided for this purpose that at least one second oscillation body is provided spaced apart from the first oscillation body, to which at least one second excitation module is assigned for accelerating the second oscillation body, and that the inertial sensor is fastenable/is fastened with one first attachment point to the first oscillation body and with one second attachment point to the second oscillation body. Thus, the inertial sensor may be accelerated at two attachment points or fastening points having different oscillation bodies which, in particular, are mounted oscillatably independent of one another. In this way, it is possible, for example, to compensate for a resonance of the second oscillation body during an excitation of the first oscillation body by detecting and evaluating the acceleration signals.

It may be provided that each oscillation body is assigned at least two excitation modules, which are aligned/situated in such a way as to accelerate each oscillation body in different directions. Thus, an at least two-dimensional acceleration of each oscillation body is ensured, as a result of which the examination of the inertial sensor is optimizable.

It further may be provided that each oscillation body is assigned three excitation modules, which are configured/aligned to accelerate the respective oscillation body in three different directions. In this way, a three-dimensional excitation of each oscillation body or a three-dimensional acceleration of each oscillation body is ensured, resulting overall in a 2×3D acceleration or testing of the inertial sensor.

It particularly may be provided that one excitation direction of one excitation module of the first oscillation body corresponds in each case to one excitation direction of one excitation module of the second oscillation body. This ensures that both oscillation bodies may be accelerated in the same excitation direction by one excitation module each. It is provided, in particular, that the excitation modules of the first oscillation body and the excitation modules of the second oscillation body are aligned/situated in such a way that the oscillation bodies may each be accelerated in three identical spatial directions. In this way, an advantageous evaluation of the acceleration signals of the inertial sensor is possible.

According to one refinement of the present invention, it is provided that the excitation modules each include one, in particular, multiple piezo-actuators. It is provided, in particular, that the piezo-actuators, i.e., piezo stacks, are joined together, in order together to accelerate the respective oscillation body in the desired direction. By providing piezo stacks, it is possible to implement high accelerations and large travel paths or movements of the oscillation body.

Each excitation module advantageously includes at least one control sensor, which regulates the activation of the actuators, in particular, of the piezo-actuators as a function of a desired acceleration or of an oscillation body and/or of the inertial sensor. As a result, the inertial sensor may be excited with an actually desired acceleration and the signals of the inertial sensor detected in the process may be advantageously evaluated.

The method according to the present invention including the features of claim 7 is distinguished by the fact that the inertial sensor is fastened with a first attachment point to the first oscillation body and with a second attachment point to a second oscillation body, which is spaced apart from, in particular, mounted independently of, the first oscillation body, the second oscillation body being accelerated by at least one second excitation module in at least one direction. This results in the previously cited advantages.

It is provided, in particular, that each oscillation body is accelerated in each case by three excitation modules in different directions. It is provided, in particular, that the two oscillation bodies are accelerable or are accelerated in the same directions. For this purpose, the excitation modules are situated on the respective oscillation body in such a way that an excitation module of the first oscillation body and an excitation module of the second oscillation body each operate in the same direction.

It further may be provided that in order to examine the behavior of the inertial sensor to be tested, the oscillation bodies are accelerated simultaneously or successively in different directions or in identical spatial directions.

A transfer matrix, via which interfering accelerations may be compensated for, may particularly be provided as a function of the activation of the excitation modules and of the resulting generated accelerations of the oscillation bodies. An acceleration generated by one of the excitation modules in one direction may simultaneously also result in an acceleration in another direction, which is considered to be an interfering acceleration. In order to prevent this interfering acceleration during the examination of the inertial sensor, the transfer matrix is provided, which compensates for such acceleration deviations or interfering accelerations.

The present invention is explained in greater detail below with reference to the drawings.

BRIEF DESCRIPTION OF THE DRAWINGS

FIG. 2 schematically shows a depiction of the device and

DETAILED DESCRIPTION

Figure 1A:
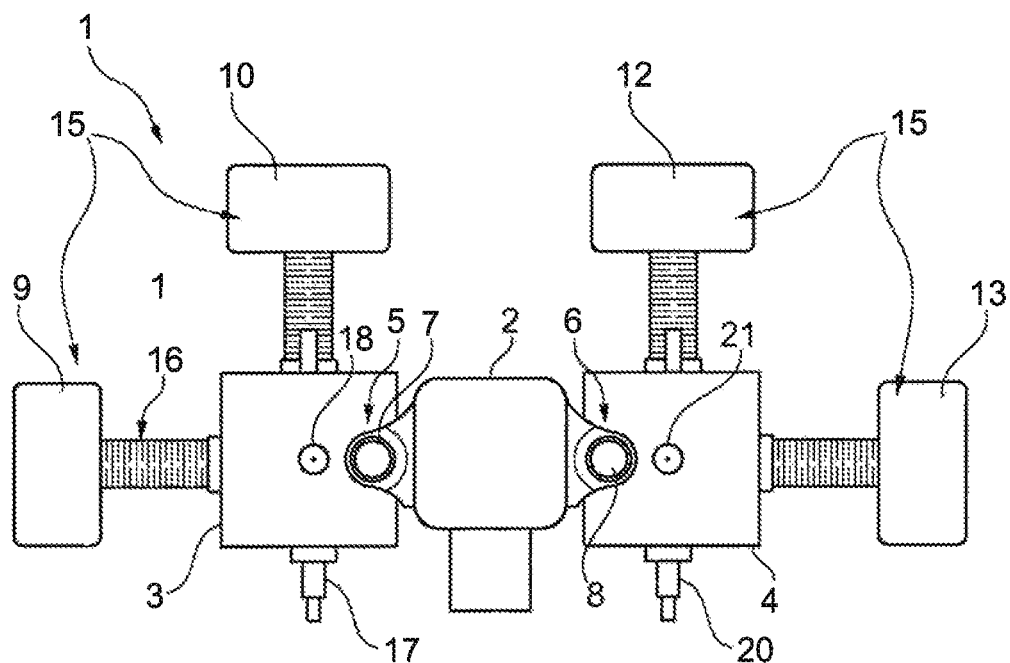
FIGS. 1A and 1B show a device for testing an inertial sensor in various views.
Figure 1B:
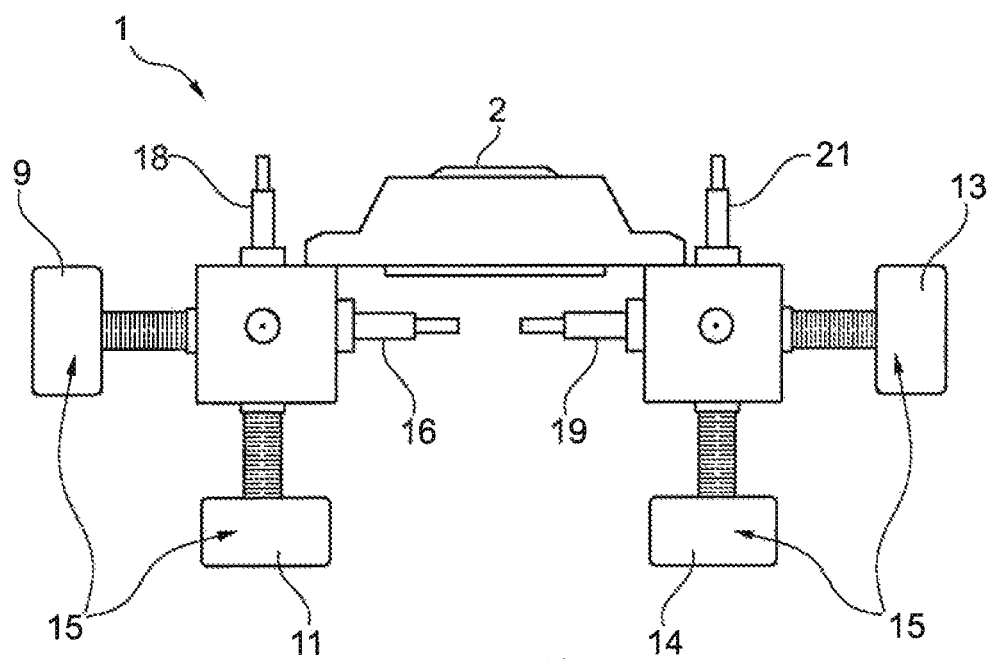

FIGS. 1A and 1B show in a top view (FIG. 1A) and in a side view (FIG. 1B) a device 1 for examining an inertial sensor 2, which is configured, for example, as an acceleration sensor and/or a rotation rate sensor and is used in motor vehicles.

Device 1 includes two oscillation bodies 3 and 4, configured as steel cuboids, respectively. Alternatively, however, the steel cuboid may also be produced from other materials, for example, from tungsten, ceramic, aluminum or beryllium. Oscillation bodies 3, 4 are situated spaced apart from one another and each includes a fastening point 5, 6 for inertial sensor 2. Inertial sensor 2 includes two attachment points 7, 8, with the aid of which inertial sensor 2 is fastened to oscillation bodies 3, 4 or to their fastening points 5, 6. Attachment points 7, 8 are correspondingly also spaced apart from one another, in the present case situated/formed on two opposite sides of inertial sensor 2 or of a housing of inertial sensor 2.

Each of oscillation bodies 3, 4 are assigned three excitation modules 9, 10, 11 and 12, 13, 14. Excitation modules 9 through 14 each include as actuators, multiple piezo-actuators connected in series, which together form a piezo stack 15. The piezo stacks are activatable independently of one another, so that they may accelerate respective oscillation bodies 3, 4 independently of one another. Piezo stacks 15 of excitation modules 9 through 14 are aligned here in such a way that each oscillation body 3, 4 is acceleratable in three different spatial directions. Piezo stacks 15 are, in particular, aligned perpendicular to one another, so that oscillation bodies 3, 4 may each be accelerated in the x, y and z-direction. Excitation modules 9 through 14 each also include a control sensor 16, 17 and 18, as well as 19, 20 and 21. Control sensors 17 through 21 in this case are situated on each side of respective oscillation bodies 3, 4 opposite the respective piezo stack of the respective excitation module 9 through 14. Each excitation module 9 through 14 in this case also includes a counterweight for the respective piezo stacks. The entire structure of device 1 is loose and may be mounted tension-free on foam material, for example. Instead of three control sensors, it is also possible for a single 3D acceleration sensor to be situated on, for example, adhered, to each oscillation body 3, 4.

FIG. 2 schematically shows a depiction of device 1. A control unit 22 activates the piezo-actuators and excitation modules 9 through 14. For this purpose, control unit 22 sends a signal, for example, to excitation module 9. Excitation module 9 includes a digital-analog converter 23, which is connected upstream from an amplifier 24 which, in turn, is connected to the piezo stack of excitation module 9 for activating the excitation module. Inertial sensor 2 is excited by the generated acceleration and an output signal SA of inertial sensor 2 is measured. At the same time, control sensor 16 of excitation module 9 detects the actual acceleration generated by piezo stack 15, feeds this to an amplifier 25, which is connected upstream from an analog-digital converter 26 which, in turn, sends an output signal to control unit 22. As a result of this feedback, desired accelerations may be very precisely exerted on respective oscillation bodies 3, 4 and on inertial sensor 2.

Real-time signals, which have been measured at the attachment point of the inertial sensor in a vehicle, may be reproduced with the device in a stationary position in the laboratory. The signals are ascertained by the two units consisting of oscillation bodies and three excitation modules each, for example, during test drives with the motor vehicle on various test routes. Different signals for each of the three spatial directions may be fed in by the device at both attachment points of inertial sensor 2. Feedbacks of the respective other excitation directions may be compensated for by the advantageous device. By reproducing the acceleration signals measured in the vehicle, different patterns with comparable excitation may be tested for the first time. As a result of advantageous device 1, therefore, a significant cost savings is achieved by dispensing with complex vehicle measurements. Also resulting from this is a time savings when comparing the sensitivity of inertial sensor 2, for example, in the case of varying pattern statuses or of differences in the processing and packaging technology.

The acceleration signals measured in the vehicle at the attachment points of inertial sensor 2 are read in by the control software of control unit 22. The required output signal for individual piezo stacks 15 is calculated by the control software via multiplication by a complex transfer matrix in the frequency range. Influences of the lateral directions may be compensated for by the determination of the transfer matrix.

To determine the complex transfer function, test signals are applied successively at excitation modules 9 through 14, whereas all other excitation modules receive a zero signal, the resulting acceleration is measured at all control sensors. The test signals and sensor signals are transformed into the frequency range and then divided (matrix division). The result is a quadratic matrix of complex transfer functions, which produce the transfer matrix. Each entry in the matrix corresponds to a complex transfer function of one exciter to one sensor having x-frequency lines. The selected setpoint signals are transformed into the frequency range and form the complex setpoint vector. An algorithm is then necessary, which calculates the output signal for the exciters from the given values in such a way that the acceleration on the test object most closely approximates the recorded setpoint curve. For this purpose, the setpoint vector is multiplied by the inverse transfer matrix. The result is a vector of complex output signals in the frequency range. The output vector is transformed into the time range and output. At the same time, the acceleration signals are recorded and registered at sensors 17 through 21.

Three operating modes are provided for the evaluation: In the straight method, the data are conveyed unchanged to the oscillation exciter or the respective excitation module. This is exclusively for comparison purposes. In the single method, a one-dimensional processing of the data corresponding to the first stage of the algorithm of the tried and tested chart program takes place separately for each channel without taking the mutual influence of the channels into account. Thus, with the given structure, it is possible to attain correlations up to 0.95. The method is shown to be particularly robust under complex conditions due to the simple mathematics. In contrast, the matrix method uses the aforementioned algorithm, significant improvements with combinations >0.995 being achievable as a result.

Figure 3A:
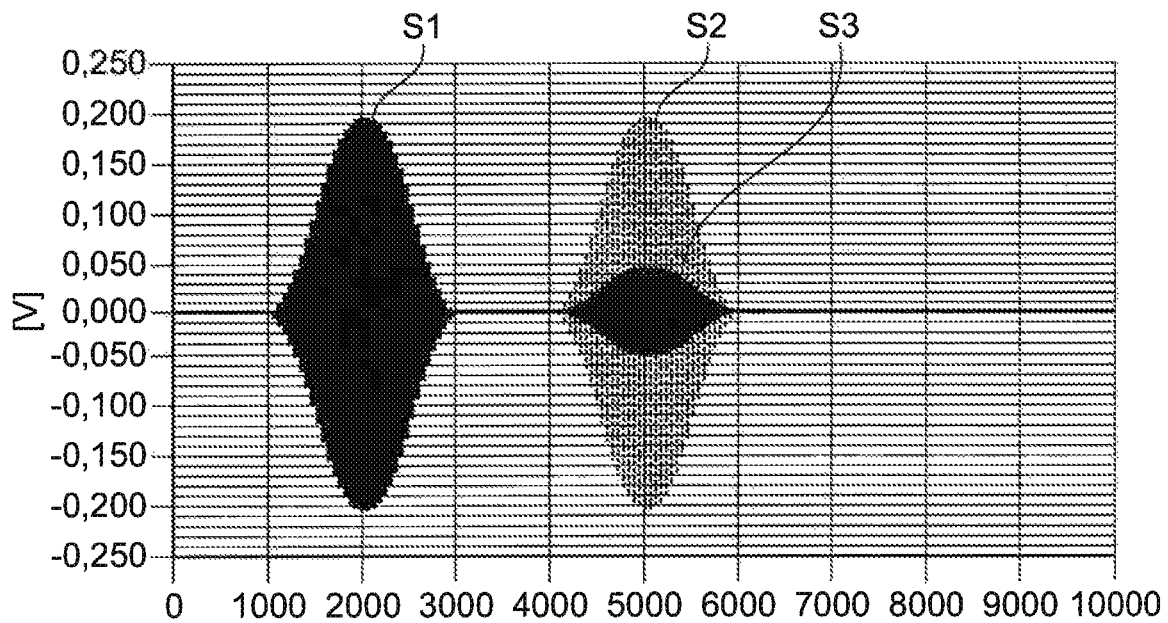
FIGS. 3A and 3B shows acceleration curves of control sensors.
Figure 3B:
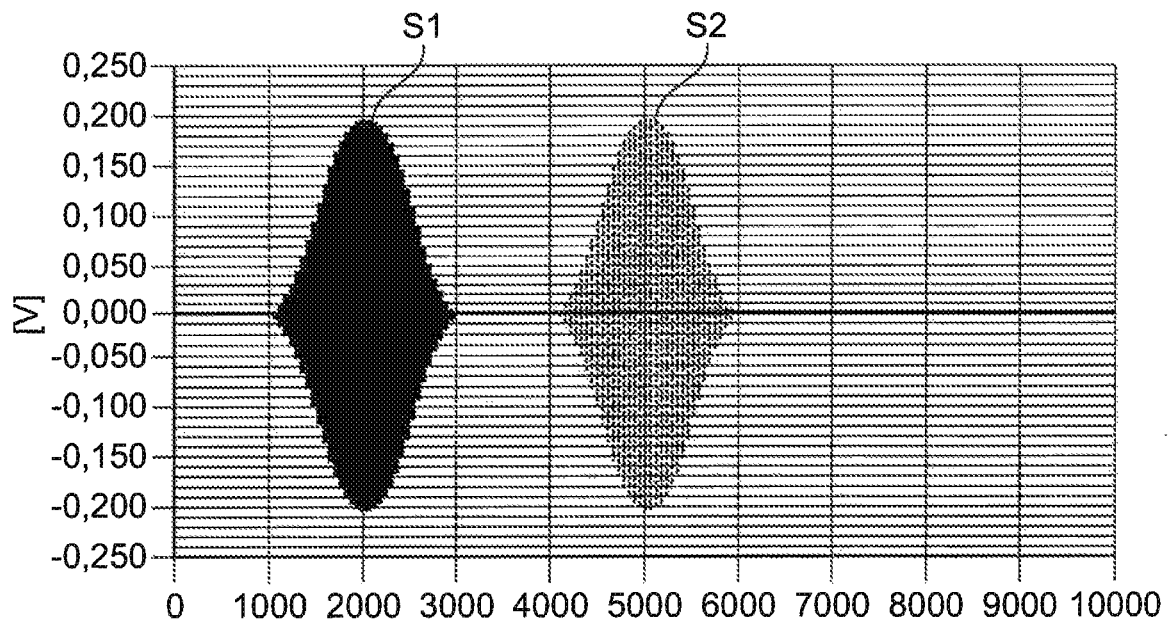

FIGS. 3A and 3B each show the acceleration curve along two axes of device 3. In FIG. 3A, two excitation modules, for example, excitation modules 9 and 10, are excited time-delayed each with a sinus burst with 200 kS/s (x-axis 8 kHz, y-axis 10 kHz). In this case, the acceleration detected with the corresponding control sensor as a result of the first sinus burst is represented as S1 and the acceleration detected with the corresponding control sensor as a result of the second sinus burst is represented as S2. It is found that second sinus burst S2 causes a resonance of the x-axis (S3).

FIG. 3B shows the result when the previously described matrix method is used with the complex transfer matrix. The cross-talk or resonance of the x-axis is completely eliminated. For this purpose, the piezo stack (channel 0) of the one axis is activated in such a way that it generates an opposing output signal with the frequency of the resonator (channel 1) and precisely the correct amplitude and phase, in order to offset the undesirable lateral oscillation.

Thus, with the aid of the transfer matrix and device 1, it is possible to implement a high correlation between setpoint curve and actual curve of accelerations in six axes. For example, sinus burst, noise signals, actual recorded shock curves or opposing sinus sweeps are output as test signals.

As previously mentioned, setpoint curve Xs(t) is transformed via Fourier transformation into the frequency range and multiplied by inverted complex transfer function H(f). By inverse transformation into the time range via inverse Fourier transformation, required output signal Xo(t), which is output as a voltage curve to the respective piezo-exciter, is obtained. Measured acceleration signal Xi(t) is subsequently compared with the setpoint curve and another iterative compensation is carried out according to a particular method. In practice, correlations of >0.999 between Xi and Xs are achieved in this way under optimal conditions. Crucial here is the exact determination of the transfer function. In the case of multi-dimensional excitation, a mutual influencing of the accelerations occurs in non-ideal oscillation exciters as a result of, for example, lateral oscillations of the exciters, of mechanical couplings on inertial sensor 2, of cross-sensitivity of the sensors or as a result of the load influence of inertial sensor 2 to be tested. With the device, the cited influences are at least largely eliminated. For this purpose, the dynamic behavior of an N-dimensional structure is precisely measured and a complex transfer matrix H is created.

H00(f), for example, is the transfer function of excitation module 9, between its piezo stack 15 and assigned control sensor 16 (for example, x-direction). H01(f) is then the transfer function between piezo stack 15 of excitation module 9 and control sensor 17 (for example x→y-direction).

H00(f) and H11(f) form here the main diagonal of the matrix and correspond to the transfer between the exciter of one direction each and the associated sensor of the same direction, whereas H01(f) and H10(f) characterize the cross-influences. The first approach to the resolution is the calculation according to the chart program method for each direction, this means, x-exciter+x-sensor, y-exciter+y-sensor, z-exciter+z-sensor. In this approach, only the elements of the main diagonal of the matrix are used and the cross-influences are disregarded. However, this so-called single method becomes less precise in the case of multi-dimensional excitation as a result of mutual influencing.

For each frequency line, an N-dimensional system of equations is solved by the described matrix method: The N-setpoint signals form a setpoint vector Xs (1, N). The transfer behavior is characterized by a quadratic transfer matrix H(N, N). Output vector Xo (N,1) is ascertained by solving the N-dimensional system of equations. The calculation, by definition, takes place in the complex frequency range, separately for each frequency line. As in the case of the chart method, a transfer into the time range takes place for each output channel via inverse Fourier transformation.

What is claimed is:

1. A device for testing an inertial sensor for a vehicle, comprising:
    at least one first oscillation body, to which the inertial sensor is fastenable;
    three first excitation modules assigned to the first oscillation body and spaced apart from one another, each of the three first excitation modules configured to accelerate the first oscillation body in a different direction relative to one another, and to accelerate the first oscillation module independently of one another; and
    at least one second oscillation body spaced apart from the first oscillation body;
    three second excitation modules assigned to the second oscillation body and spaced apart from one another, each of the three second excitation modules configured to accelerate the second oscillation body in a different direction relative to one another, and to accelerate the second oscillation body independently of one another, the three second excitation modules being separate from the three first excitation modules;
    wherein the inertial sensor is fastenable with a first attachment point to the first oscillation body and with a second attachment point to the second oscillation body.

2. The device of claim 1, wherein one acceleration direction of one of the first excitation modules of the first oscillation body corresponds to one acceleration direction of one of the second excitation modules of the second oscillation body.

3. The device of claim 1, wherein the three first excitation modules and the three second excitation modules each include at least one piezo actuator.

4. The device of claim 1, wherein each of the three first excitation modules and each of the three second excitation modules includes at least one control sensor.

5. A method for testing an inertial sensor for a vehicle, which includes at least two attachment points, the method comprising:
    fastening the inertial sensor with a first attachment point to the first oscillation body and with a second attachment point to a second oscillation body spaced apart from the first oscillation body;
    accelerating the first oscillation body by three first excitation modules which are spaced apart from one another, each of the three first excitation modules accelerating the first oscillation body in a different direction relative to one another and independently of one another; and accelerating the second oscillation body by three second excitation modules which are spaced apart from one another, each of the three second excitation modules accelerating the second oscillation body in a different direction relative to one another and independently of one another, the three second excitation modules being separate from the three first excitation modules.

6. The method of claim 5, wherein the first oscillation body and the second oscillation body are accelerated simultaneously or successively in different or in identical spatial directions.

7. A method for testing an inertial sensor for a vehicle, which includes at least two attachment points, the inertial sensor being attached on at least one first oscillation body and the oscillation body being accelerated by at least one first excitation module in at least one direction, the method comprising:

fastening the inertial sensor with a first attachment point to the first oscillation body and with a second attachment point to a second oscillation body spaced apart from the first oscillation body; and accelerating the second oscillation body by at least one second excitation module in at least one direction;

wherein a transfer matrix, via which interfering accelerations are compensated for, is generated as a function of the activation of the excitation modules and the thereby generated accelerations.

8. The device of claim 1, wherein each of the three first excitation modules and each of the three second excitation modules includes multiple piezo actuators.

9. The device of claim 1, wherein the different directions that the three first excitation modules accelerate the first oscillation body are orthogonal to one another, and the different directions that the three second excitation modules accelerate the second oscillation body are orthogonal to one another.

10. The method of claim 5, wherein the different directions that the three first excitation modules accelerate the first oscillation body are orthogonal to one another, and the different directions that the three second excitation modules accelerate the second oscillation body are orthogonal to one another.

* * * * *